Figure 1:
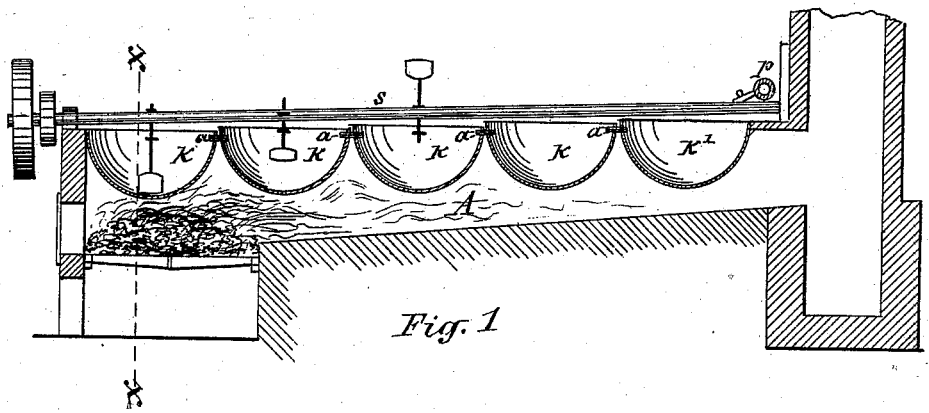

A. H. CRAWFORD.
Apparatus for the Manufacture of Salt.

No. 214,759. Patented April 29, 1879.

WITNESSES:
C. Bendixen
A. Wood

INVENTOR:
A. Herbert Crawford
per E. Laass, his Attorney.

UNITED STATES PATENT OFFICE.

A. HERBERT CRAWFORD, OF LIVERPOOL, NEW YORK.

IMPROVEMENT IN APPARATUS FOR THE MANUFACTURE OF SALT.

Specification forming part of Letters Patent No. 214,759, dated April 29, 1879; application filed January 27, 1879.

*To all whom it may concern:*

Be it known that I, A. HERBERT CRAWFORD, of Liverpool, in the county of Onondaga, in the State of New York, have invented new and useful Improvements in Apparatus for the Manufacture of Salt, of which the following, taken in connection with the accompanying drawings, is a full, clear, and exact description.

This invention has reference to the manufacture of salt from brine or saline water by artificial heat, and relates more especially to means for purifying and evaporating brines containing matter which forms incrustations on the interior of the evaporating-vessel.

It being universally understood by manufacturers of salt that all natural brines are impregnated with more or less mineral substances foreign to the chemical constituents of pure salt, and detrimental to the purposes for which salt is used, various methods and means have been resorted to in the manufacture of salt for the removal of these impurities from the brine.

More or less advantageous results have been attained with brines which are free of gypsum and other substances which incrust the evaporating-vessel; but with brines containing such impurities none of the existing apparatus or devices, so far as I am aware, have been able to economically and successfully produce good salt, and none have as yet superseded the old method and means, which are as follows: The brine is conveyed from its source into large tanks or cisterns at the evaporating-works, where it is partially clarified, and subsequently conveyed direct to each kettle or evaporating-vessel by a pipe extending the length of the works, and having a faucet for each of the said vessels. These vessels, often numbering forty and upward, are set in a row over a fire-arch, and each of them receives its brine direct from the pipe or conduit aforesaid, and is operated independent of the remainder of the evaporating-vessels. The brine as it enters the kettles brings with it all the impurities held in solution by the low temperature of the brine in the cistern and conduit, and these impurities are collected in pans set on the bottom of each kettle and removed by the same. So soon as the brine has been brought to saturation the salt begins to crystallize and debars further removal of impurities. The remnant of same is boiled down with the brine, and consequently goes into the salt, which is not drawn until the water is nearly all evaporated.

The objections to this mode of manufacturing salt from this peculiar quality of brine are many and serious, and may be enumerated as follows: First, each kettle having to be boiled down to obtain the salt exposes at times to the fire a large portion of the kettle not covered by the brine, and thus allows the heat radiating from said portion to escape into the air; second, the aforesaid exposure to the air causes formation of rust upon the interior of the kettle, which rust becomes intermixed with the succeeding charge of brine and stains the salt; third, the kettle being replenished while hot and nearly empty is frequently caused to crack; fourth, the brine requiring to be relieved of its impurities before it is brought to saturation, that brine which is in the kettles near the fire is not allowed sufficient time to become purified, and the impurities are carried into the salt, and cause incrustations on the interior of the kettle; and, fifth, the process requires constant attention and a great amount of manual labor.

The object of this invention is to obviate the aforesaid injurious effects and to reduce the expenses of the manufacture.

Figure 2:
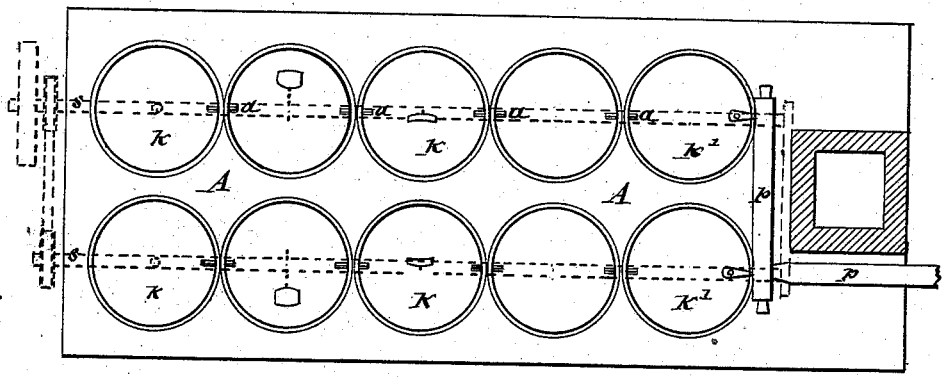
Figure 3:
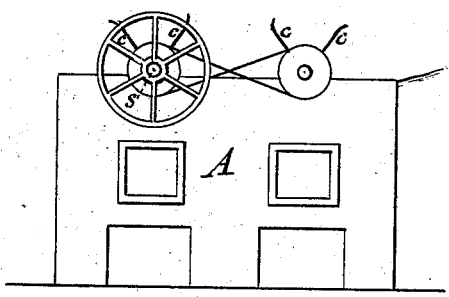
Figure 4:
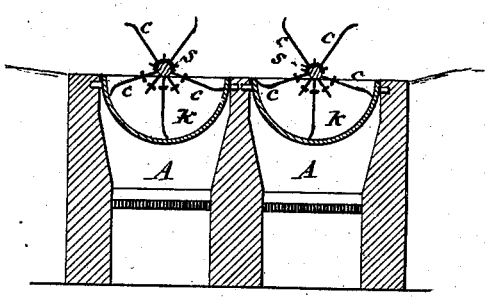

In the accompanying drawings, Figure 1 is a longitudinal section of a salt-water-evaporating apparatus provided with my improvements; Fig. 2, a plan view of same; Fig. 3, a front elevation, and Fig. 4 a transverse vertical section on line $x\ x$ in Fig. 1.

Similar letters of reference indicate corresponding parts.

A represents a fire-arch constructed in the usual manner, with the furnace at one end and the chimney at the opposite end, and having a series of hemispherical cast-iron kettles, $k\ k$, set back of one another in a row over the fire-arch. Such kettles have proved to be the only practical means adapted for the treatment of the afore-described peculiar quality of brine, inasmuch as they allow of the severe jar and the use of sharp and heavy tools required for the removal of the incrustation on the interior of the evaporating-vessel. It is, therefore, this particular class of vessels which I employ in connection with my improvements. These kettles I arrange in the fire-arch A, in the manner before described, and connect each with its adjacent kettle by a pipe, $a$, extended from one to the other, at or near the top of same and in line with the center of the fire-arch, thus forming a direct course for the flow of the brine from the kettle at the least-heated end of the fire-arch toward those most exposed to the fire employed, and maintaining the flow in the center of the fire-arch, where the heat is most concentrated, and at a more uniform temperature under the respective kettles.

The brine is brought from the reservoir or the usual cistern near the works to the rearmost or least-heated kettle $k'$ by a pipe, $p$, or suitable conduit terminating at the said kettle, and is admitted thereto by a faucet or suitable gate for regulating the ingress of the brine. It flows toward the source of heat from kettle to kettle through their communicating connections, and fills each kettle to the required depth, and is maintained constantly at such depth by regulating the ingress in the kettle $k'$, thereby obviating the danger of cracking the kettles, and preventing the formation of rust on the interior of same. As the brine flows slowly through each intermediate vessel toward and into the vessels subjected to the greatest heat, it is in its passage gradually heated and brought to saturation, and at the same time caused to precipitate or deposit its impurities—i. e., gypsum, iron, &c.—which impurities are collected in pans set upon the bottom of said kettles, and provided with a long handle for their manipulation and the removal of the impurities, in the same manner as heretofore. The purified and saturated brine still flowing toward the source of heat deposits the salt in the vessels near said locality.

Therefore, it will be observed that in vessels where the salt is crystallized no impurities are required to be removed, and in vessels where the impurities are deposited and removed no salt is crystallized or removed, thereby obviating incrustation of the impurities on the interior of those kettles where the salt is obtained, and accelerating evaporation thereat.

I am aware that salt-water-evaporating apparatus have been arranged to convey the brine in a continuous flow and in a circuitous or sinuous course from the least-heated kettle, through the series of intervening kettles, into those most exposed to the fire employed; but such arrangements necessitate longitudinally-partitioned vessels or pans, which, on account of the shape of their bottom, do not afford the necessary facility for removing the salt, and, in consequence of their inability to resist the jar and the application of sharp and heavy tools required for the removal of the scale, are difficult to clean, and therefore not adapted for the treatment of brine containing matter which incrusts the evaporating-vessel; and since the temperature at the sides of the fire-arch is variable and generally cooler than in the center thereof, the aforesaid sinuous course of the brine subjects the same to alternating various degrees of heat, and thereby prevents or to a great extent retards the separation and precipitation of the impurities of the brine. These defects I avoid by the use of the hemispherical kettles $k\,k$, connected with each other at or near their top by the pipe $a$, arranged in line with the center of the fire-arch, as before described.

I do not claim the said pipe when connected with the bottom of the vessel, as I am aware the same is not new; nor is it adapted for the purpose for which my invention is designed, inasmuch as such an outlet would carry the impurities from one kettle into the other.

To reduce the expense of manual labor and of fuel, and at the same time advance the evaporating process, I arrange longitudinally over the center of the row of kettles $k\,k$ a shaft, $s$, provided at one end with a pulley or gear-wheel, by which it is connected with a suitable motive power and made to rotate. Over the center of those kettles from which the salt is to be obtained I connect with the said shaft a scoop, $c$, or other suitable implement extending radially therefrom, and having sufficient longitudinal play in the shaft to allow it to conform to the kettle in its rotation through same, and thus scrape it and gather the salt as fast as it is deposited therein. By this means accumulation of the salt in the kettle and its incrustation on same are effectually prevented, and the brine constantly agitated without the expense of manual labor.

Having thus described my invention, what I claim as new, and desire to secure by Letters Patent, is—

1. The combination, in an apparatus for purifying and evaporating salt-water by artificial heat, of the kettles $k\,k$, placed centrally in the fire-arch, and each successive kettle set on a lower plane than the preceding one, descending from the rear and cooler end to the front and hotter end of the fire-arch, and connected with each other at or near their top by the pipes $a$, arranged in line with the center of the fire-arch, substantially as described and shown, for the purpose set forth.

2. In combination with the hemispherical kettles $k\,k$, the horizontal shaft $s$, arranged centrally over said kettles and provided with the self-adjusting scoop or scraper $c$, substantially as described and shown, for the purpose set forth.

3. The apparatus for evaporating salt-water by artificial heat, consisting of a series of kettles or pans set in a row over a fire-arch, and communicating with each other, the inlet of the brine connected with and terminated at the vessel least exposed to the heat of the fire employed, and a shaft arranged longitudinally over the center of the row of kettles, and having radially extended therefrom suitable implements for agitating the brine and removing the salt from the kettles, all constructed, combined, and operating substantially as described, for the purpose set forth.

In testimony whereof I have hereunto set my hand this 23d day of January, 1879.

A. HERBERT CRAWFORD.

Witnesses:
C. BENDIXEN,
I. LAASS.